United States Patent
Raaf

(10) Patent No.: US 7,428,406 B2
(45) Date of Patent: Sep. 23, 2008

(54) DATA TRANSFER METHOD FOR HALTING COMMUNICATION OF DATA WHEN A TRANSFER GAP IS DETECTED

(75) Inventor: Bernhard Raaf, Neuried (DE)

(73) Assignee: Siemens Aktiengesellschaft, Munich (DE)

( * ) Notice: Subject to any disclaimer, the term of this patent is extended or adjusted under 35 U.S.C. 154(b) by 701 days.

(21) Appl. No.: 10/504,617

(22) PCT Filed: Feb. 17, 2003

(86) PCT No.: PCT/EP03/01584

§ 371 (c)(1), (2), (4) Date: Aug. 13, 2004

(87) PCT Pub. No.: WO03/069852

PCT Pub. Date: Aug. 21, 2003

(65) Prior Publication Data

US 2005/0094561 A1    May 5, 2005

(30) Foreign Application Priority Data

Feb. 15, 2002  (EP) ................. 02003551
Mar. 28, 2002  (EP) ................. 02007174

(51) Int. Cl.
  H04L 12/26  (2006.01)
  H04L 12/56  (2006.01)
  H04Q 7/00   (2006.01)
  H04J 3/16   (2006.01)
  H04J 3/24   (2006.01)
  H04J 3/00   (2006.01)
  H04B 7/212  (2006.01)

(52) U.S. Cl. ............... 455/63.4; 455/430; 370/235; 370/329; 370/468

(58) Field of Classification Search ......... 370/468, 370/235, 329; 455/63.4, 430
See application file for complete search history.

(56) References Cited

U.S. PATENT DOCUMENTS 6,208,859 B1 *   3/2001  Halvorson ............. 455/430
6,891,852 B1 *   5/2005  Cloutier et al. ........ 370/468
2004/0224637 A1 * 11/2004 Silva et al. ............ 455/63.4
2005/0094561 A1 *  5/2005  Raaf .................... 370/235
2007/0097914 A1 *  5/2007  Grilli et al. ........... 370/329

FOREIGN PATENT DOCUMENTS

EP  1091515       4/2001
WO  WO 01/65882   9/2001

OTHER PUBLICATIONS

XP002246528—Universal Mobile Telecommunications System (UMTS); Multiplexing and channel coding (FDD) (GPP TS 25.212 version 4.3.0 Release 4) Dec. 1, 2001.
XP002246557—"Interaction between compressed mode and HSDPA" Jan. 11, 2002 pp. 1-6.

* cited by examiner

Primary Examiner—William D Cumming

(57) ABSTRACT

A data transfer method via a packet oriented channel and a continuous channel in parallel between a mobile station and a base station, where the transfer via the continuous channel is interrupted whereby at least one transfer gap is formed.

8 Claims, 3 Drawing Sheets

(a) Single-frame method (b) Double-frame method

Fig. 6   Packet oriented Channel

Continuous Channel

DATA TRANSFER METHOD FOR HALTING COMMUNICATION OF DATA WHEN A TRANSFER GAP IS DETECTED

Exemplary embodiments of the present invention relate to data transfer or data transmission methods, that utilize the interdependencies between compressed mode and data transfer, especially between compressed mode and packet oriented data transfer e.g. in UMTS (Universal Mobile Telecommunications System) via HSDPA (High Speed Downlink Packet Access), cf. [3]. Compressed mode is applied under an embodiment if inter-frequency measurements, e.g. for handover procedures or OTD measurements, are performed.

BACKGROUND

Terminal or user equipment in a communications system may perform measurements on frequencies different from its actual sending/receiving frequency in order to observe measurements from devices such as base stations or to perform OTD (Observed Time Difference) measurements. During this time (transfer gap) no data transfer takes place. To maintain an average data transfer rate, the data rate outside of the transfer gap is increased in certain time frames. The operational mode in these time frames is referred to as compressed mode. This compressed mode influences the data transfer, and creates interdependencies among various data.

A base station is typically defined as a central unit in a cellular communications network, that serves terminals or user equipments within a cell of the communications network. Typically, it comprises at least a sending/receiving unit. In UMTS it is often referred to as node B.

This can be described by using an example regarding a UMTS System:

During a connection that is established between a communication device or user equipment (UE) and a base station (BS or Node B), the user equipment may also observe other base stations in order to find out the base station the optimum connection can be installed to.

For observing another base station, the user equipment has to tune in on frequencies distinct from its actual sending/receiving frequencies. Thus during the time the user equipment is observing other frequencies, no data is being transmitted or received, at least if the user equipment has only one synthesizer and/or only one RF-part (RF: Radio Frequency).

However, the user of the user equipment should not notice under normal working operation, that the data transfer has been disrupted in order to create transfer gaps for the so called "inter-frequency measurements" by which frequencies distinct from the actual sending/receiving frequency or frequencies are observed. In the framework of the UMTS standardization, this item is dealt with in [1].

To maintain a constant average data rate in the presence of transfer gaps, the net data transfer rate is increased before and after the transfer gaps. "Net data" in this context refers to data actually carrying information. A predetermined overhead is added to the net data to ensure that the data can be decoded correctly at the receiver, even if the transmission has not been ideal, i.e. experiences some degradation. The overall data is referred to as gross data, wherein the overhead of data may consist of parity bits originating from channel coding. Data transfer may be either the transmission or the reception of data or both.

An illustration of a transfer disrupted by a transfer gap TG, e.g. a transmission gap, is shown in FIG. 1, which is taken from [1]: The transmit power is depicted versus time, wherein the latter is segmented in frames F as time intervals, each frame itself contains several time slots. The frames during which the user equipment listens to another base station and thus cannot be transferring data continuously are referred to as compressed frames, as the transfer rate has to be increased in some timeslots in this frame to achieve an average rate similar to normal frames, that is when the compressed mode is off.

The frames, in which the data are transferred compressed, are referred to as compressed frames, and the respective operating mode as compressed mode.

In compressed frames, TGL (transmission gap length) slots from a first slot $N_{first}$ to a last slot $N_{last}$ are not used for transmission of data. As illustrated in FIG. 1, the instantaneous transmit power P, which is depicted versus time t, is increased in the compressed frame $F_c$, before and after the transmission gap TG with the length TGL in order to keep the quality (the BER (Bit Error Rate) or the FER (Frame Error Rate)) unaffected by the reduced processing gain. F denotes the length of a normal frame. By "reduced processing gain" it is meant that the data is encoded less safe than during "normal transmission". The amount of power increase depends on the actually used transmission time reduction method (see [1], subclause 4.4.3).

In FIG. 2 an ordinary transmission sequence can be seen, which is used to explain the terms demodulation, coding etc.

The signal may be generated at the source or transmitter TX. In a subsequent analog to digital converter A/D the signal is digitized, thus the smallest information carrying unit is one bit. Digitizing includes the steps of sampling and quantizing the signal. Then various coding steps in the encoder C are performed: source coding is performed to get rid of redundancies in the signal or digitized data are used directly (which means no A/D converting or source coding etc needs to be done); channel coding is applied to protect the bits. After coding the signal is spread. At this point the smallest information carrying unit is a chip. Due to spreading the chip rate for a transmission is typically considerably higher than the bit rate.

At the digital modulator DM the data is 'translated' into symbols that differ for the various modulation and coding schemes. The higher a modulation the higher the number of bits that are translated into a symbol.

Next the data being transferred may be subject to influences from noise and interference that can have an impact on the data. For example a previous symbol (1,1) at the digital demodulator might be changed to (0.7,0.9). Hence, the transfer is referred to via an analogous channel AC. At the receiving side the corresponding processes of demodulation at the digital demodulator DD and the decoding at the Decoder D and the digital to analog conversion at the D/A converter are taking place.

Generally speaking, in compressed mode the transmit power is increased to ensure a safe transmission of the less safe encoded data: By coding the data less, with the same gross data transfer rate a higher net data transfer rate can be achieved. The data bits are preferably punctuated more than in the frames before or the coding of the data bits has been performed with a lower spreading factor. The compressed mode therefore entails rather complex calculations how the gross data are modified
    depending on the gap length
    and on the current data transfer rate
    and on the duration of the compressed mode (cf. FIG. 1, the
        time required for the time slots with the higher transmitting power)
    and in how this modification is realized, e.g. by using a
        different modulation scheme a different spreading factor puncturing of data, i.e. cutting out individual or group of bits.

It is decided by the network which frames are compressed. When in compressed mode, compressed frames can occur periodically or requested on demand. The rate and type of compressed frames is variable and depends on the environment and the measurement requirements. In OSI-layers above the physical layer the knowledge of the scheduling of the compressed frames is existent, thus the above mentioned calculations for the compressed mode can be done. As a further variant for the realization of compressed frames, it is known that higher layers can also restrict the data rate during frames which will undergo compression on the physical layer, thus making the operation in compressed mode more reliable because less excessive rate matching will be necessary for the compressed frames due to the lower data-rate.

Furthermore, transmission gaps can be placed at different positions, depending on factors such as interfrequency power measurement, acquisition of control channel of another system or carrier and handover operation, cf. [1], section 4.4.4. For the so called single frame method, the transmission gap is located within the compressed frame. The exact position depends on the length of the transmission gap TGL (transmission gap length). For the double frame method the transmission gap is overlaps two neighbored frames. In the example of FIG. 3a (discussed in greater detail below), the single frame method is shown, in FIG. 3b an example for the double frame method.

For example, this type of compressed mode is applied in UMTS (Universal Mobile Telecommunications System) to the DPDCH (Dedicated Physical Data Channel), across which data are transferred by circuit switching. As explained above, the methods for compressing the frames require rather complex calculations.

Furthermore, packet switched transfer modes, which may be operated in parallel to the circuit switched modes or continuous channels via which data, such as speech can be transferred, are affected by the transmission gaps TG. This will be detailed below: In a packet switched transfer mode, the data is segmented into packets. Each packet is transferred individually. The quality of the reception is decided on basis of various data operations such as demodulation or decoding (cf. FIG. 2). The receiver sends back a receipt of the reception, e.g. an 'ACK' (Acknowledge) or a 'NACK' (Not acknowledge) depending whether it has recognized a packet as been received correctly or not. A channel with packet switched transfer mode such as in UTMS, the HS-DSCH (High Speed Downlink Shared Channel) is mapped to the physical channel HS-PDSCH. An overview of this technique is provided in [3].

The HSDPA data channel may be viewed as an enhancement of the existing UMTS.downlink shared-channel (DSCH). HSDPA allows to code multiplex different users or mobile stations with spreading factor of up to 16 codes. The primary multiple access, however, is in the time domain, where different users can be scheduled every transmission time interval (TTI), which corresponds to 3 UMTS slots, i.e., 2 ms. Also the number of codes allocated to one user can change from TTI to TTI. Depending on the system load and channel conditions, the base station or Node B adapts modulation and code rate for each user A predetermined combination of code rate and modulation is referred to as MCS (Modulation and Coding Scheme) level. The MCS level may change every TTI. It is determined by the base station based on feedback information or channel quality information (CQI) from the user terminal or mobile station, which stems from channel condition measurements. The channel quality information is sent with a periodicity ranging from one to 80 TTIs.

To achieve the high data rates, modulation and coding schemes are used which allow a high information bit rate per code. Therefore so called "higher modulation" techniques are used by which a symbol contains more than 2 bits. One example is 16-CAM (Quadrature Amplitude Modulation). For these modulation techniques, the individual positions for a bit within a symbol are not equally protected. Therefore, there is the effect of mapping important bits to well protected positions and less important bits to less protected positions. This is referred to as bit priority mapping and will be detailed below using an example from HSDPA. Furthermore, for channel coding so called "turbo codes" with rate $R=\frac{1}{3}$ are used. The rate indicates the ratio of the total number of bits to the number of load or systematic bits.

The HS-DSCH is shared among several users. The respective transfer rate for each of the users is decided on basis of the individual channel quality. One of the multiple access possibilities is in the time domain, where different users can be scheduled every transmission time interval (TTI), which corresponds to three UMTS slots (UMTS: Universal Mobile Telecommunication System), or 2 ms.

The transport channel HS-DSCH is mapped—as mentioned above—to the physical channel HS-PDSCH (High Speed Physical Downlink Shared Channel), to which a compressed mode can be applied. For higher data rates, where a single HS-PDSCH cannot carry the entire data rate, a set of HS-PDSCH channels can be used, in this case all the HS-PDSCHs of the set are transmitted simultaneously and they can be distinguished because they use different spreading codes. However, the invention as described herein should not be affected whether one HS-PDSCH or a set is used.

In principle the above described compressed mode can be applied to packet switched data, too. Therefore calculations need to be done as described in the references below (cf. [2]). However, a simpler process is desirable to make the calculations less complex.

SUMMARY OF THE INVENTION

An exemplary embodiment of the invention provides an easy solution to handle the interdependencies between compressed mode and a packet switched data transfer channel.

An exemplary embodiment of the invention provides a transmission method, where information is transmitted in packets, and where transmission or reception gaps are provided, whereby no transmission or reception is performed during transmission or reception gaps.

The aforementioned embodiment includes a method and an arrangement which are characterized by a data transfer method wherein data are transmitted in packets between a mobile station (MS) and a base station (BS), wherein no transmission or reception of data is performed during transmission or reception gaps, that are provided for a mobile station to tune to other frequencies. The exemplary embodiment operates regardless of whether data is transferred or transmitted in packets outside of transmission or reception gaps that can be used by the mobile station to tune to other frequencies.

By a data transfer method according to an exemplary embodiment of the invention, data is transferred between a mobile station and a base station via a packet oriented channel and a continuous channel in parallel. Under this configuration, the transfer via the continuous channel is interrupted such that at least one transfer gap is formed.

Under the aforementioned embodiment, after the reception of a data packet no receipt, e.g. an 'ACK' or a 'NACK', is sent back by the receiver after a first processing time. The first processing time is referred to as 'UE-processing time' and denotes the time between the end of reception of a signal and the start of transmission of a successive or subsequent signal, which may be an ACK or NACK signal as in the case of the UMTS system. In UMTS 5 ms are allocated for the UE-processing time. The timing structure of HSDPA is illustrated in FIG. 3, where also the length of 1 TTI can be seen, which corresponds to 2 ms in UMTS.

During a first processing time, the signal is prefereably demodulated, wherein a set of symbols is assigned to a set of incoming data, and to allot a probability to each symbol or bit, that the decision for a symbol or bit has been correct. By not sending a receipt during the transmission gap the gap is maintained despite of the HSDPA transmission and the gap can be used for the initially described observation of other frequencies.

Under another exemplary embodiment of the invention, a data packet is stored by the receiver to establish a first data set. A decoding is done, when the data packet has been received repeatedly, thus at least a second data set is provided. By a joint decoding of the data sets the performance of the decoding process is improved in respect to decoding e.g. the first data set alone.

Under yet another embodiment of the invention, the receipt is sent back after the processing time plus a certain delay. This also ensures, that no receipt is transferred in the transmission gap.

Accordingly, a method is disclosed to restrict the scheduling of HSDPA transmissions in order not to compromise compressed mode operation and still sacrifice as little data throughput, especially HSDPA throughput, as possible.

BRIEF DESCRIPTION OF THE DRAWINGS

The invention and its wide variety of potential embodiments will be more readily understood through the following detailed description, with reference to the accompanying drawing in which:

FIG. 6 is a schematic diagram of a communications network showing data transfer between a mobile station and a base station via a continuous channel and a packet oriented channel, respectively, according to an exemplary embodiment of the invention.

DETAILED DESCRIPTION

The present disclosure will illustrate in greater detail various applications of the compressed mode and its implications on the HSDPA transmission. Generally speaking, methods according to the invention propose to withhold sending any feedback during a transmission gap. This is done either by not sending any acknowledgement, e.g. an ACK or an NACK, that would be transmitted during a transmission gap, or by sending it with a delay sufficient to postpone its transmission after the transmission gap. As explained above, the feedback is normally used in packet oriented transmission to acknowledge the receipt of a transmission (ACK) or the failure to receive a packet correctly.

As a result, the data packets whose acknowldegements are affected are either being re-transmitted or not re-transmitted at all.

The above mentioned continuous data channel may be the DCH (Dedicated Channel) and the corresponding Dedicated Physical Data Channel and Dedicated Physical Control Channel by which data, such as speech, can be transferred.

These considerations also apply to uplink and downlink compressed mode scenarios as well. The following illustrations will differentiate between uplink and downlink compressed mode:

Restrictions on HSDPA Transmission Due to Downlink Compressed Mode

The restrictions that accompany (downlink) HSDPA transmission can be described as follows: During the transfer gaps provided by compressed mode, the user equipment is free to tune to other frequencies and therefore cannot receive any signals on its currently assigned frequency.

In general, during the transfer gaps the user equipment may not receive any signal. In other words, the base station may send signals during the transfer gap, but signals are not necessarily received by the user equipment. Accordingly, under one embodiment the user equipment may disregard specific details of the signal such as the offset of the DPCH against the HS-DSCH and HS-SCCH (High Speed Synchronisation Control Channel) or the specific details of the compressed mode patterns or the different frame structure types.

Figure 1:
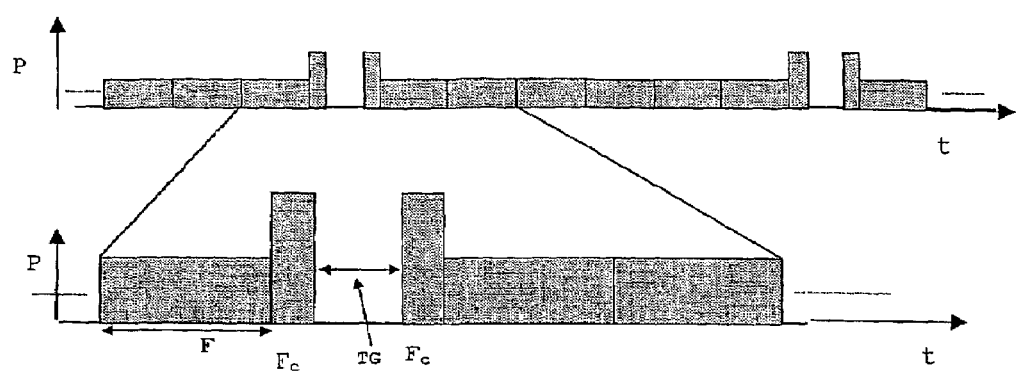
FIG. 1 illustrates a scheme of a compressed mode transmission.
Figure 2:
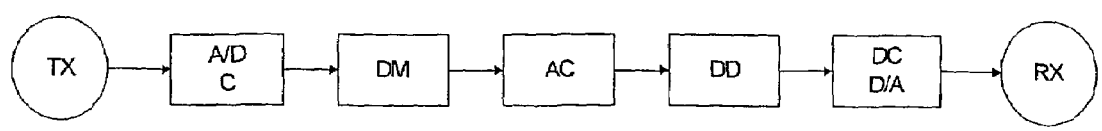
FIG. 2 is a block diagram of transmission process.
Figure 3:
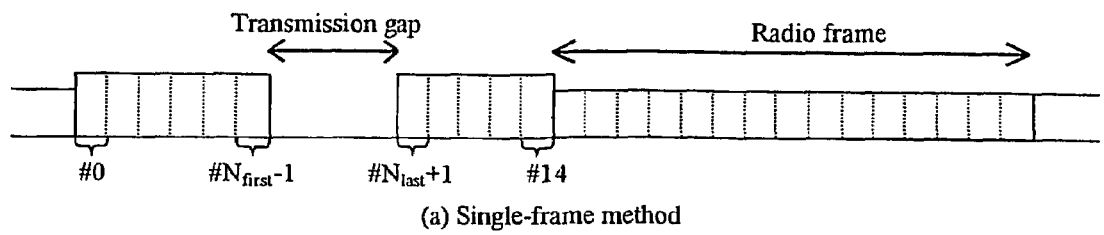
FIG. 3 illustrates possible positions of the time transmission interval, for a) the single frame method and for b) the double frame method.
Figure 3:
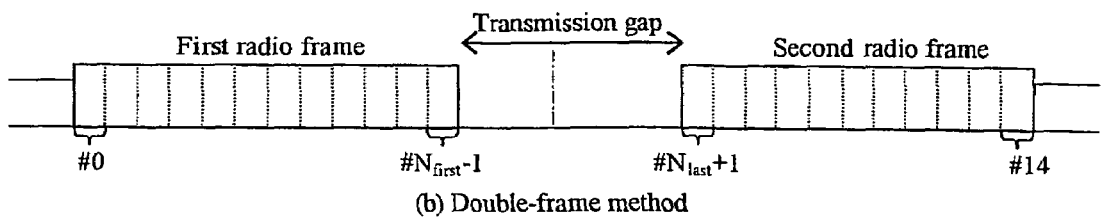

For any given offset and for given parameters of the compressed mode, a calculation is made as to whether HS-SCCH or HS-SDCH overlap with the transfer gap. An overlap is typically given if any single chip of the HSDPA transmission would overlap with any single chip (see FIG. 2 and accompanying text) of the transfer gap. Further more, because the HI transmission (HI:HS-DSCH Indicator) always fully overlaps the corresponding HS-SCCH transmission (if the HI is transmitted at all, the system can also be designed without the HI), it is sufficient to consider only the latter.

In another exemplary embodiment the base station does not transmit any data. While it is preferable if the base station knows that the user equipment does not listen during the time in question, this does not necessarily have to be the case. For example, if the transfer gap of the compressed mode only partially overlaps with a HSDPA TTI, then it may be possible for the user equipment to still receive parts of the TTI and, due to the error correcting coding which is applied, it might be possible to decode the data packet also from this partial reception. This is in particular possible, if the packet was already a retransmission, in which case it might be possible to decode the packet based on the received information of the earlier transmission(s) plus that partial one. It may also be the case that successful decoding is not possible due to the part of the TTI that is missed during the gap, however, the received part of the TTI, together with a subsequent transmission may make it possible to decode the data.

Therefore, the user equipment receives at least part of the data even if the TTI (partly) overlaps with a transfer gap by compressed mode. The user equipment can then either perform a complete decoding or only store these data in the user equipment soft buffer (how this is done will be described in more detail in an other embodiment described herein). In yet an other variant the user equipment may, at least for some transfer gaps, decide that it does not need to interrupt communication as long as the entire transfer gap, but only for a shorter time. This may be possible if the actions that are scheduled for a particular transfer gap can also be performed in this shorter time. This may be the case for example, if the user equipment has a synthesiser that can be tuned to the other frequencies more quickly than was assumed when the requirements were decided. Another possibility is that the action scheduled for a particular transfer gap can inherently be done in a shorter time, e.g. a so called BSIC—verification on an other GSM frequency (BSIC=Base Station Identification Code). This can be done in a rather short time, but the exact position of this time within the transfer gap may not be known at the base station when the transfer gap is being scheduled, so that a larger transfer gap is scheduled than will actually be necessary in the end.

Restrictions on HSDPA Transmission Due to Uplink Compressed Mode

The restrictions due to uplink compressed mode are somewhat different, because it is not the downlink HSDPA transmission that is causing the trouble but the uplink sent receipt, e.g. the ACK/NACK (Acknowledge/Not acknowledge) transmission. During the transmission gaps for uplink compressed mode, the user equipment is not able (and therefore not requested) to transmit anything, in particular not a receipt. However, this does not rule out the possibility for the base station, which in UMTS is also often called Node B, to transmit an associated downlink HSDPA transmission before the transfer gap.

The only restriction a base station has to take into account is the fact, that it cannot expect the user equipment to transmit any receipt, e.g. either ACK or NACK, in response to this HSDPA transmission. As a consequence, the base station will not get an information about whether the user equipment has correctly received the packet and will therefore have to retransmit the packet in any case. Under this configuration, the throughput can be increased, as the base station will not use a MCS (Modulation an Coding Scheme) where there is a fair chance that the user equipment will decode the initial transmission, but it will use a MCS where the second transmission has such a fair chance.

A modulation and coding scheme is also described, wherein the scheme identifies which transmission method is being used for the packet, and further identifies the amount of redundancy that is used and is available for error correction purposes (coding), as well as the modulation scheme which describes how many bits are transmitted with a single symbol. As an example, for QPSK (Quadrature Phase Shift Key) two bits are transmitted while for 16 QAM (Quadrature Amplitude Modulation) transmission 4 bits are transmitted. The code rate R describes how many redundancies are being used, R is defined as R=Number of bits before of coding/Number of bits after coding

TABLE 1

Modulation and Coding Scheme (MCS)

| MCS level | modulation | code rate R | info bit rate per code |
|---|---|---|---|
| 5 | 16-QAM | 3/4 | 720 kbps |
| 4 | | 1/2 | 480 kbps |
| 3 | QPSK | 3/4 | 360 kbps |
| 2 | | 1/2 | 240 kbps |
| 1 | | 1/4 | 120 kbps |

Figure 4:
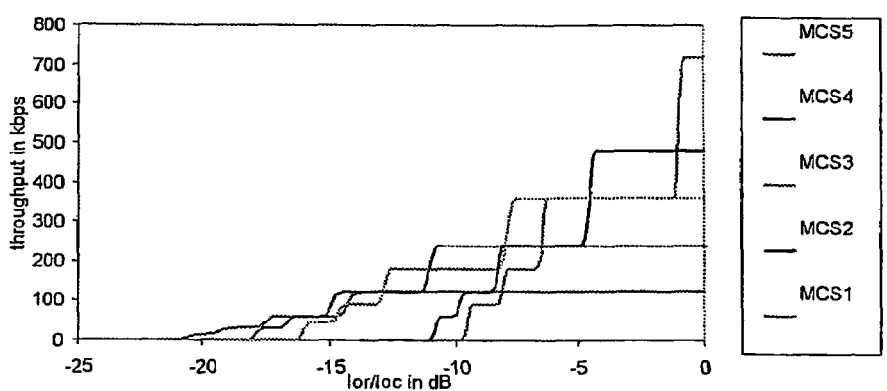
FIG. 4 illustrates the throughput for HSDPA depending on the Modulation and coding scheme.

The above table gives an example of a possible set of Modulation and Coding Schemes that can be used and FIG. 4 illustrates the throughput that can be achieved depending on the channel quality for these Modulation and Coding Schemes.

The abscissa $I_{or}/I_{oc}$ (described below) is the ratio of the total power spectral density of the downlink to one user terminal to the power spectral density of the band limited noise and interference.

$I_{or}/I_{oc}$ is defined as $$\frac{I_{or}}{I_{oc}} = \frac{E_b}{N_0} \cdot \frac{R_b}{R_c} \cdot \frac{1}{g_d}$$

where $E_b/N_0$ is the bit energy to spectral noise density, $R_b$ is the bit rate, and $R_c$ is the chip rate. The factor $g_d$ is fraction of radiated power devoted to the HSDPA data channel. An total overhead of 20% is assumed (e.g., for signalling channels and pilot channels which are used to determine the influence of the transmission medium on the received signals by the user equipment) leading to $g_a=0.8$. Under this configuration, the abscissa denotes basically the signal to noise ratio.

The steps in the throughput curves are achieved if the initial transmission fails and a retransmission has to be done, which will make the throughput drop in half for the second transmission, to a third for the third transmission and so on. As can be seen from the graph, after one retransmission a level 2 Modulation and Coding Scheme achieves a throughput of 129 kbps (kilo bits per second) after the second transmission, just as MCS level 1 for the first transmission, in a similar range of the channel quality. In that range the same throughput can be achieved with two transmissions of MCS level 2 as with a single transmission of MCS level 1.

As a result, the initial transmission will have a rather low success probability, which means the ACK/NACK signal that is 'lost', because it is not sent due to the uplink compressed mode transfer gap is most likely a NACK signal, thus rendering the information redundant.

It is noted that a scheduler (the control unit in the base station which decides which user equipment to serve during the next TTI and which MSC to use), is free to always use such an operating point or transfer mode, which also has the advantage of increased time diversity due to combination of two transmissions at different times. The throughput of a higher MCS with retransmission is very similar to the throughput of a MCS carrying half as much payload for an initial transmission. If this scheme is employed, uplink compressed mode does not degrade the throughput of a HSDPA session.

As mentioned previously, the base station will not schedule a HSDPA transmission for a user equipment which is using compressed mode, if part of the HS-SCCH information or the corresponding HS-DSCH TTI (TTI: Transmission Time Interval) overlaps with a transfer gap of downlink compressed mode.

Figure 5:
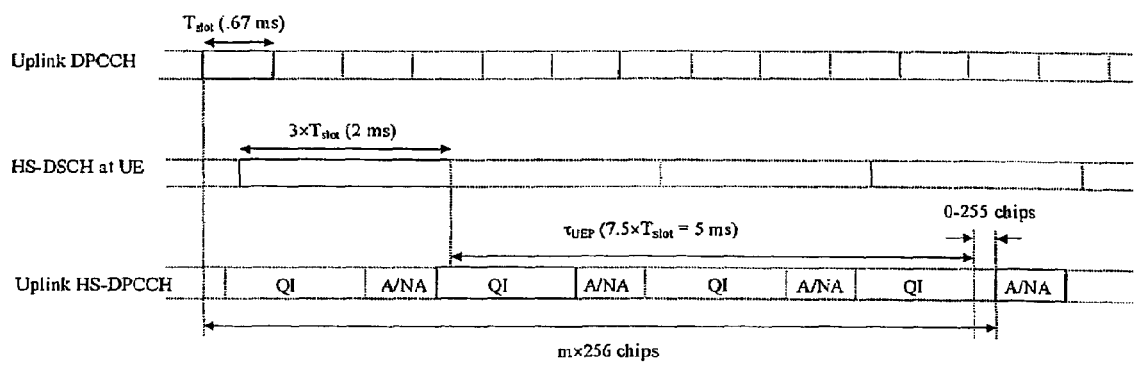
FIG. 5 is a timing structure of HSDPA uplink timing.
Figure 5:
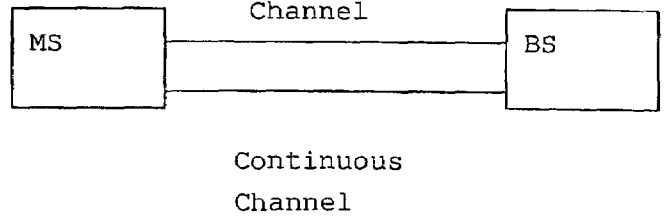

FIG. 5 illustrates how part of the HS-SCCH or the HS-DSCH can overlap with a transfer or transmission gap:

A detailed timing diagram of the HSDPA channels in relation to other UMTS channels is given in FIG. 5. FIG. 5 shows the timing offset between the downlink HS-DSCH (High Speed Downlink Shared Channel) and the uplink DPCCH (Dedicated Physical Control CHannel). The code-multiplexed uplink HS-DPCCH starts m*256 chips after the start of the uplink DPCCH with m selected by the UE such that the ACK/NACK transmission (of duration 1 timeslot) begins within the first 0-255 chips after 7.5 slots following the end of the received HS-DSCH. The UE processing time (indicated as $\tau_{UEP}$) is therefore maintained at 7.5 slots (5.0 ms) as the offset between DPCCH and HS-DPCCH varies. The ACK bit is sent on the first slot of the code multiplexed uplink HS-DPCCH. Every first slot on the HS-DPCCH, chosen according to the parameters above, are reserved for ACK/NACK signaling (marked with A/NA in FIG. 5). The other two slots on the HSDPCCH can be used for CQI transmission (marked with QI in FIG. 5). $T_{slot}$ indicates the duration of one slot (i.e. 0.67 ms).

From FIG. 5 it can be seen, that the receipt, that is the ACK or the NACK is sent after the data. Therefore, the receipt can overlap with a transmission gap even if the actual data do not.

If a part of an ACK/NACK signal overlaps with a transfer gap of uplink compressed mode, the user equipment is not requested to transmit it. Instead, the user equipment may discontinuously transmit (DTX: discontinuous transmission) the affected timeslot on the uplink HS-DPCCH. Furthermore the user equipment does not need to attempt to decode the transmitted packet, but is only requested to store the data of the corresponding HS-DSCH TTI in the virtual user equipment buffer to be able to combine them with data sent in subsequent TTIs.

The detailed operation of the scheduler in the base station can be vendor specific, and specific implementations of the scheduler can be done by those versed in the art in accordance with the rules set forward herein. All that needs to be specified, is the fact that the user equipment is not requested to transmit any receipt, e.g. a ACK/NACK signal, that overlaps an uplink compressed mode transfer gap. Preferably, no overlap of even a single chip is allowed. As a consequence, it will be invisible from the outside, whether the user equipment could correctly decode the HSDPA transmission and therefore the user equipment does not even have to attempt to decode this packet, all it has to do is store the soft decision values in the virtual user equipment buffer where they will be combined with the next transmission which will then be processed as usual, including transmission of an ACK/NACK Signal.

Restrictions on QI Transmission Due to Uplink Compressed Mode

Similar restrictions due to uplink compressed mode as for the receipt (e.g. ACK/NACI (signal) affect also any other uplink HSDPA transmission, i.e. the Quality Indicator (QI) transmission.

The QI conveys information regarding the quality of the downlink channel as seen from the user equipment and is used by the base station to detect, which of the user equipments attached to a base station have a good reception and are therefore suited for HSDPA transmission.

Again, during the transfer gaps for uplink compressed mode, the user equipment is not able (and therefore not requested) to transmit anything, in particular not the QI transmission.

The QI transmission is intermittent or not continuous due to the measurement feedback cycle, even if it is possible to request the user equipment to transmit a QI in every TTI as a special case.

Furthermore the base station has to process corrupted or undecodable QI transmissions, so no special actions or provisions are expected to be necessary for the QI transmission; it can simply be omitted if there is a collision with an uplink compressed mode transfer gap. Again, it is preferable that not even a single chip of overlap is allowed.

As discussed previously, the user equipment is not requested to transmit a Quality Indicator signalling, if a part of it overlaps with a transfer gap of uplink compressed mode. Instead the user equipment may simply not transmit anything during the affected timeslots on the uplink HS-DPCCH. This behaviour is also called DTX (Discontinuous Transmission).

Restrictions Due to Simultaneous Uplink and Downlink Compressed Mode

If both uplink and downlink compressed mode are activated at the same time, or if multiple compressed mode patterns are activated, then the restrictions due to the individual transfer gaps exist in parallel. This means a downlink or uplink transmission is only feasible, if it is compatible with all the transfer gaps. Thus any receipt is not to be sent in any transfer gap.

Further Aspects and Embodiments

In the above text, the disclosure illustrates how an uplink transmission (any receipt, e.g. ACK or QI) is not sent if it would overlap with a transmission gap.

Under yet a further exemplary embodiment, the affected transmission can also be delayed until a time, when it is possible to do the transmission. The delay can in principle take any value (e.g. the delayed transmission could start immediately after the end of the transfer gap). However, in order to ease the implementation, it is preferable to delay the transmission by an integer number of timeslots. In case that more than one data packet has been transmitted during a compressed mode operation, that is more than one receipt is being delayed, the individual receipts are sent after the delay with an interval of one timeslot instead of one TTI to catch up for the delay faster than it would be the case with an interval of one or more TTIs.

Under yet a further exemplary embodiment of the invention, the delayed transmission is not delayed by an integer number of timeslots, but by an integer number of TTIs. This will ease the implementation at both the user equipment and base station, because the delayed transmission will then be received at a time when this type of transmission is anyhow due. Therefore the entire transmission respectively reception chain can be easier implemented. Under this configuration, the entire system is designed and implemented so that it works optimum for the given delays, i.e. when the transmission is sent at the nominal time. Any further delay will mean, that the action which is done in response to the ACK/NACK or the QI will not be possible any more at the time without any delay, but only at a later TTI. This action will accordingly be the scheduling decision on the next TTI, (i.e. which user equipment to transmit user data, which modulation and coding scheme to use and whether to transmit a new packet or to repeat an old one). If the ACK/NACK command is delayed by an integer number of TTIs, then the aforementioned response can also only be sent an integer number of TTIs later. If the delay is however less, i.e. an integer number of TTIs minus a fraction of a TTI, then the response can not be sent one entire TTI earlier, because the ACK/NACK came after the 'deadline' for that TTI. In other words, trying to optimize the delay of a transmission of an ACK/NACK (likewise for the QI which also influences subsequent transmissions) by a fraction of a TTI is not desirable. Thus the implementation of an integer of the number of TTIs is preferred.

Integer delays of the number of TTIs are used particularly if there is a simultaneous transfer gap in both uplink and downlink compressed mode, due to the backlog of the outstanding ACK/NACK signals which were built up before the transfer gap could be finished after the transfer gap and before new ACK/NACK signals associated with HSDPA transmissions after the transfer gap have to be transmitted. The reason for this is that the HSDAP downlink transmission is longer than the ACK/NACK transmission, therefore the transfer gap blocks at least as many downlink transmissions as ACK/NACK transmissions. However, in uplink only compressed mode (i.e. if there are gaps only in the uplink direction), this is not the case because no downlink frames are blocked. In order to avoid a backlog the ACK/NACK signal is not transmitted or, alternatively, the ACK/NACK signal is transmitted with a delay which is not necessarily a multiple of a TTI. It is preferable to select a multiple of a timeslot. For reasons similar to those detailed above, it would not be advantageous to select a delay which is not a multiple of a timeslot: None of the transmitted ACK/NACK signals would be received earlier than a fraction of a timeslot earlier compared to the slot aligned case.

In yet another exemplary embodiment, the delay can be set to be a multiple of slots which are not a multiple of a TTI at the same time. Under this configuration, delayed ACK/NACK transmissions that block the timeslots which are allocated for current ACK/NACK transmissions can be avoided.

In yet another exemplary embodiment, only every second TTI can be used for transmission of delayed ACK/NACK signals, together with a new ACK/NACK signal which needs not to be delayed, leaving two timeslots of every other frame available for QI transmission.

In yet another exemplary embodiment, a first delayed ACK/NACK transmission (or multiple transmissions) are transmitted after the transfer gap, subsequently followed by QI transmission, particularly if a QI transmission would also have been scheduled during the transfer gap or during a delayed ACK/NACK signal.

In yet another exemplary embodiment, ACK/NACK and/or QI transmissions are sent after the transfer gap, preferably at a time when other ACK/NACK signals or QI transmissions would be scheduled. In this case these latter transmissions are also delayed, until they can be sent.

In yet another exemplary embodiment, ACK/NACK transmission is prioritised over QI transmission, i.e. if both an ACK/NACK signal is pending and a QI transmission the latter is further delayed and the pending ACK/NACK is transmitted before of the QI transmission.

In yet another exemplary embodiment, only a single QI transmission is sent if a QI transmission has been delayed until the nominal transmission time of a later QI transmission. Instead of transmitting two or more QI transmissions one after the other, it may be sufficient to send only one QI. Transmitting two QIs in short succession in this case is redundant, because the channel quality will not have changed significantly during such a short time.

In yet another exemplary embodiment, a QI transmission which cannot be sent at its nominal time due to a compressed mode transfer gap is delayed until a timeslot also allocated for QI transmission. It should be noted that normally no QI may be sent during this particular timeslot because QI transmission is only done intermittently). Consequently, the QI transmission is delayed by an integer number of TTIs rather than an integer number of timeslots.

Generally speaking, the following variations may be implements or combined:
a) the delay is such, that the receipt is sent immediately after the transfer gap.
b) the delay has the length of an integer number of time slots.
c) the delay has the length of an integer number of transmission time intervals (TTI).

The present disclosure generally relates to HSDPA and compressed mode, however, as will be apparent to those skilled in the art, the same principles can easily be applied to other systems or scenarios, where a packet communication is established, but some time intervals are not available for uplink or downlink communication due to constraints from other aspects of the system. Such constraints can come from an other communication e.g. a circuit switched connection which runs in parallel. It can also be another system, which runs in parallel and is incompatible due to some reasons with the packet transfer and therefore causes some time intervals not to be available for the packet transfer. Such other system can be another communication system, which competes for some limited resources e.g. a receiver or causes mutual interference. It can also be a completely different action, which competes for e.g. energy sources or computing resources or other resources.

For example, in FIG. 6 the transmission of data in a communications system or network according to the UMTS standard comprises a terminal or mobile station MS and a base station BS. With the introduction of the HSDPA transmission, the data transmission, via a packet oriented channel and a continuous channel, are in parallel. Both channels have to provide or to establish transmission gaps during which the user equipment tunes to other frequencies. For a packet oriented channel, the following aspects can be considered
a) No transmitting of packets during the transmission gaps
b) Receipts, e.g. ACKs or NACKs that are sent during the transmission gaps will not be received. Therefor, the further packet transfer has to be carried out without knowledge of that receipt.

Further Aspects of the Invention in Respect of the UMTS Standardization:

During compressed frames (or gaps) on the DCH (Dedicated Channel) there is no HS-DSCH (High Speed Downlink Shared Channel) activity for the UE (User Equipment), including signalling in DL/UL(Downlink/Uplink. (Note: Compressed mode is applied on DCH only).

The embodiments described below serve to restrict the scheduling of HSDPA transmissions in order not to compromise compressed mode operation and still sacrifice as little HSDPA throughput as possible. At the same time a compact formulation to be used in the Technical Report [5] and the working change requests (CR) for the specifications 25.2xx is proposed.

Restrictions on HSDPA Transmission Due to Downlink Compressed Mode

The restrictions which have to be accepted for (downlink) HSDPA transmission can be described as follows: During the gaps provided by compressed mode, the UE (User Equipment) is free to tune to other frequencies and therefore cannot receive any signals on its currently assigned frequency.

For any given offset and for given parameters of the compressed mode, a calculation is made to determine whether HS-SCCH or HS-SDCH overlap with the gap. Note that an overlap is already given if any single chip of the HSDPA transmission would overlap with a any single chip of the gap. Further more, because the HI transmission always fully overlaps the corresponding HS-SCCH transmission, it is sufficient to consider only the latter.

Restrictions on HSDPA Transmission Due to Uplink Compressed Mode

The restrictions due to uplink compressed mode are somewhat different from the downlink, because it is not the downlink HSDPA transmission that is causing the trouble but the uplink ACK/NACK (Acknowledge/Not acknowledge) transmission. During the gaps for uplink compressed mode, the UE is not able to transmit anything, and particularly not the ACK/NACK signal. However, this does not rule out the possibility for the Node B to transmit an associated downlink HSDPA transmission before of the gap.

The only restriction a Node B has to take into account is the fact, that it cannot expect the UE to transmit either ACK or NACK in response to this HSDPA transmission. As a consequence, the Node B will not get an information about whether the UE has correctly received the packet an will therefore have to retransmit the packet in any case. Under this configuration the throughput can be increased: The Node B will not use a MCS (Modulation an Coding Scheme) where there is a fair chance that the UE will decode the initial transmission, but it will use a MCS where the second transmission has such a fair chance. Then the initial transmission will have a rather low success probability, which means the ACK/NACK signal that is lost (and is not sent) due to the uplink compressed mode gap is most likely a NACK signal, so the information would be redundant. Note that the scheduler is free to always use such an operating point, which also has the advantage of increased time diversity due to combination of two transmissions at different times. The throughput of a higher MCS with retransmission is anyhow very similar to the throughput of a MCS carrying half as much payload for an initial transmission. If this scheme is employed, uplink compressed mode does not degrade the throughput of a HSDPA session.

This behavior may be specified in the following manner: the UE is configured such that it is not requested to transmit an ACK/NACK signal that overlaps an uplink compressed mode gap. Under this configuration, not even single chip of overlap is allowed. Consequently, it will be invisible from the outside, whether the UE could correctly decode the HSDPA transmission and therefore the UE does not even have to attempt to decode this packet, and all it has to do is store the soft decision values in the virtual UE buffer where they will be combined with the next transmission which will then be processed as usual.

Restrictions on QI Transmission Due to Uplink Compressed Mode

Similar restrictions due to uplink compressed mode for the ACK/NACK signal also affect other uplink HSDPA transmission, i.e. the Quality Indicator (QI) transmission. Again, during the gaps for uplink compressed mode, the UE is not able to transmit anything, in particular also not the QI transmission.

The QI transmission is intermittent due to the measurement feedback cycle (even if it is possible to request the UE to transmit a QI in every TTI as a special case). Further more the Node B has to cope with corrupted or undecodable QI transmissions, so no special actions or provisions are expected to be necessary for the QI transmission. It can simply be omitted if there is a collision with an uplink compressed mode gap. Again, even a single chip of overlap is not allowed.

Restrictions Due to Simultaneous Uplink and Downlink Compressed Mode

If both uplink and downlink compressed mode are activated at the same time, or if multiple compressed mode patterns are activated, then the restrictions due to the individual gaps exist in parallel. This means a downlink or uplink transmission is only feasible, if it is compatible with all the gaps.

Under operation of HSDPA during compressed mode, the Node B should not schedule a HSDPA transmission for a UE which is using compressed mode, if part of the HS-SCCH information or the corresponding HS-DSCH TTI overlaps with a gap of downlink compressed mode.

If a part of an ACK/NACK signal overlaps with a gap of uplink compressed mode, the UE is not requested to transmit it. Instead, the UE may DTX the affected timeslot on the uplink HS-DPCCH. Furthermore the UE does not need to attempt to decode the transmitted packet, but is only requested to store the data of the corresponding HS-DSCH TTI in the virtual UE buffer to be able to combine them with data sent in subsequent TTIs.

The UE is also not requested to transmit a Quality Indicator signalling, if a part of it overlaps with a gap of uplink compressed mode. Instead the UE may DTX the affected timeslots on the uplink HS-DPCCH.

Accordingly, under the embodiments described above, an uplink transmission (either ACK or QI) is not transmitted if it would overlap with a gap. Furthermore, the affected transmission can also be delayed until a time, when it is possible to do the transmission. The delay can in principle take any value, e.g. the delayed transmission could start immediately after the end of the gap. However, in order to ease the implementation, it is more desirable to delay the transmission by an integer number of timeslots.

Alternately, a delayed ACK/NACK signal may be transmitted after the gap, subsequently followed by QI transmission.

Furthermore, ACK/NACK and/or QI transmissions are sent after the gap, preferably at a time when other ACK/NACK signals or QI transmissions would be scheduled. In this case these latter transmission are also delayed, until they can be sent.

Also, ACK/NACK transmission may be prioritized over QI transmission, i.e. if both an ACK/NACK signal is pending and a QI transmission the latter is further delayed and the ACK/Nack is transmitted.

Also, only a single QI transmission is sent if a QI transmission has been delayed until the nominal transmission time of a later QI transmission.

Also, a QI transmission which cannot be sent at its nominal time due to a compressed mode gap is delayed until a timeslot which is also allocated for QI transmission (note that normally no QI may be sent during this particular timeslot because QI transmission is only done intermittently).

From the perspective of a base station various embodiments focus on a data transfer method as described above, whereby a packet is sent via the packet oriented channel, even in those cases where the corresponding receipt cannot be sent after a first processing time because the receipt would overlap with a transmission gap.

From the perspective of a mobile station it can be seen as a data transfer method according as described above, whereby a packet is received via the packet oriented channel, even in those cases where the corresponding receipt cannot be sent after a first processing time because the receipt would overlap with a transmission gap.

From the perspective of networks a communications network is proposed, that is adapted to perform a method as described above, said communications network comprising at least one base station and one mobile station.

In addition, although the invention is described in connection with mobile telephones, it should be readily apparent that the invention may be practiced with any type of communicating device, such as a personal assistant or even a PC-enabled device. It is also understood that the device portions and segments described in the embodiments above can substituted with equivalent devices to perform the disclosed methods and processes. Accordingly, the invention is not limited by the foregoing description or drawings, but is only limited by the scope of the appended claims.

REFERENCES

[1] R1-02-0492 TR 25.212 v4.3, section4.4 'compressed mode' with FIG. 11

[2] R1-02-0034, Samsung, 'Interaction between compressed mode and HSDPA', Espoo, Finland, January 2002.

[3] R1-02-0199, TR 25.858 'High Speed Downlink Packet access', Espoo, Finland, January, 2002.

[4] R1-02-0356, Secretary, 'Revised minutes of TSG RAN WG1 #23 meeting', Orlando, Fla., U.S.A., February 2002.

[5] R1-02-0199, TR 25.858 'High Speed Downlink Packet access', Espoo, Finland, January, 2002.

The cited documents are maintained by 3 GPP, the third generation partnership project, Address: ETSI, Mobile Competence Centre, 650, route des Lucioles, 06921 Sophia-Antipolis Cedex and are cited in the format used by this organisation.

The invention claimed is:

1. A data transfer method, comprising:
communicating data between a mobile station and a base station in parallel via a packet oriented channel and a continuous channel;
communicating data packets via the packet oriented channel;
monitoring communication of data packets;
detecting a transfer gap in communicated data packets;
interrupting communication of data via the packet oriented channel and the continuous channel when the transfer gap is detected;
receiving a first data packet;
storing information obtained from the first data packet without sending a receipt for a first processing time;
receiving a second data packet;
storing information obtained from the second data packet; and
performing a decoding making use of at least part of the information of the first data packet and at least part of the information of the second data packet.

2. The data transfer method according to claim 1, wherein the transfer gap is formed by an interruption of a reception at the mobile station.

3. The data transfer method according to claim 2, wherein the transfer gap is formed by an interruption of a transmission of the mobile station.

4. The data transfer method according to claim 1, wherein the receipt is sent after a delay.

5. The data transfer method according to claim 1, wherein the packet oriented channel is a High Speed Physical Downlink Shared Channel.

6. The data transfer method according to claim 3, wherein a time period for the transfer gap is determined by the at least one of the base station and the mobile station.

7. The data transfer method according to claim 1, wherein at least one packet is sent from the base station to the mobile station via the packet oriented channel when the at least one packet transmission does not overlap with the transfer gap.

8. The data transfer method according to claim 1, wherein at least one packet is received by the mobile station when the sending of the receipt overlaps with the transfer gap.

* * * * *